(12) United States Patent
Ung

(10) Patent No.: US 8,899,764 B2
(45) Date of Patent: Dec. 2, 2014

(54) DISTORTION-FREE IMAGE CAPTURE MIRROR WHICH MAY BE USED WITH AN AUTOMOTIVE SIDE VIEW MIRROR FOR CAPTURING AN IMAGE FROM AN AREA REPRESENTING A BLIND SPOT FOR A DRIVE OF A VEHICLE FITTED WITH THE DISTORTION-FREE IMAGE CAPTURE MIRROR

(76) Inventor: Ly Weng Ung, Buffalo, NY (US)

( * ) Notice: Subject to any disclaimer, the term of this patent is extended or adjusted under 35 U.S.C. 154(b) by 690 days.

(21) Appl. No.: 11/652,743

(22) Filed: Jan. 13, 2007

(65) Prior Publication Data

US 2007/0115571 A1   May 24, 2007

Related U.S. Application Data

(63) Continuation-in-part of application No. 10/983,922, filed on Nov. 8, 2004, now abandoned.

(51) Int. Cl.
*G02B 7/182* (2006.01)
*B60R 1/08* (2006.01)

(52) U.S. Cl.
CPC ........................... *B60R 1/081* (2013.01)
USPC .......................................................... 359/879

(58) Field of Classification Search
USPC ......... 359/871, 881, 838, 507–511, 842, 601, 359/610, 612; 248/477
See application file for complete search history.

(56) References Cited

U.S. PATENT DOCUMENTS

| | | |
|---|---|---|
| 1,774,496 A | 8/1930 | Oishei |
| 2,368,882 A | 2/1945 | Rose |
| 2,431,830 A | 12/1947 | Rose |
| 2,442,504 A | 6/1948 | Milier |
| 2,482,031 A | 9/1949 | Rose |
| 2,496,752 A | 2/1950 | Rose |
| 2,598,072 A | 5/1952 | Rose |
| 2,622,481 A | 12/1952 | Triphahn |
| 2,827,067 A | 1/1953 | Rose |
| 2,649,839 A | 8/1953 | Condon |
| 2,691,920 A | 10/1954 | Curcuru |
| 2,759,178 A | 8/1956 | Rose |
| 3,062,917 A | 11/1962 | Rose |
| 3,087,014 A | 4/1963 | Rose |
| 3,259,349 A | 7/1966 | Lee |
| 2,743,187 A | 9/1966 | Wiener |
| 3,329,770 A | 7/1967 | Rose |
| 3,329,771 A | 7/1967 | Rose |

(Continued)

FOREIGN PATENT DOCUMENTS

| | | |
|---|---|---|
| EP | 0 310 261 A1 | 4/1989 |
| EP | 0 900 696 A2 | 3/1999 |
| GB | 256776 | 8/1926 |
| GB | 895855 | 5/1962 |

*Primary Examiner* — J Doak
(74) *Attorney, Agent, or Firm* — John Charles Thompson; Sandra J. Thompson

(57) ABSTRACT

A distortion free image capture mirror assembly, and more particularly one which can be associated with side view mirrors for use by drivers on all type of vehicles. The distortion free image capture mirror assembly includes a support or housing, a distortion free mirror, and image channeling horizontal surfaces in the form of an image channeling awning disposed above the distortion free mirror, and an image channeling sill mounted below the distortion free mirror. In addition, side beams to the right and left sides of the distortion free mirror are provided. The two horizontal surfaces will serve to eliminate distracting background view and direct or channel the image from the critical blind spot area with a clear non-distorted view toward the driver.

1 Claim, 4 Drawing Sheets

(56) References Cited

U.S. PATENT DOCUMENTS

| | | |
|---|---|---|
| 3,424,424 A | 1/1969 | Kelley |
| 3,712,715 A | 1/1973 | Wagner |
| 3,972,601 A | 8/1976 | Johnson |
| 4,025,173 A | 5/1977 | Schmaedeke |
| 4,314,280 A | 2/1982 | Rose |
| 4,668,058 A | 5/1987 | Wright |
| 4,890,907 A | 1/1990 | Vu |
| 5,101,298 A | 3/1992 | Lentz |
| 5,237,453 A | 8/1993 | Jones |
| 5,421,628 A | 6/1995 | Nahm |
| 5,538,310 A | 7/1996 | Frankhouse |
| 5,594,594 A | 1/1997 | Ung |
| 6,270,225 B1 | 8/2001 | Goolshy |
| 6,519,089 B2 | 2/2003 | Graham |

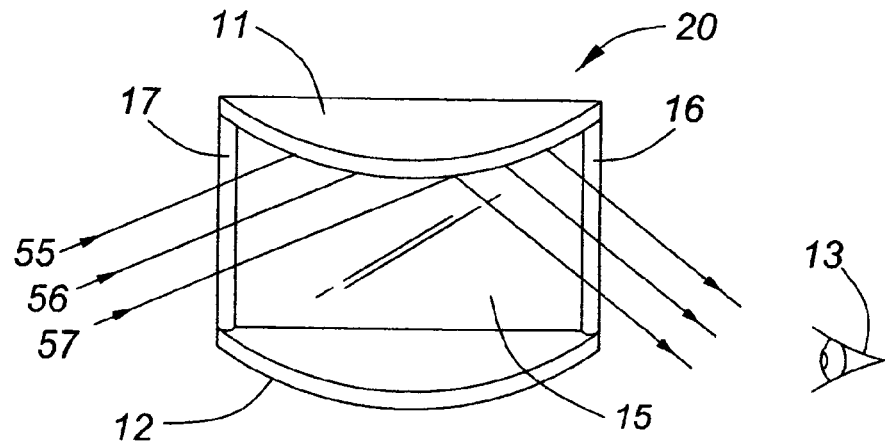
FIG. 1A
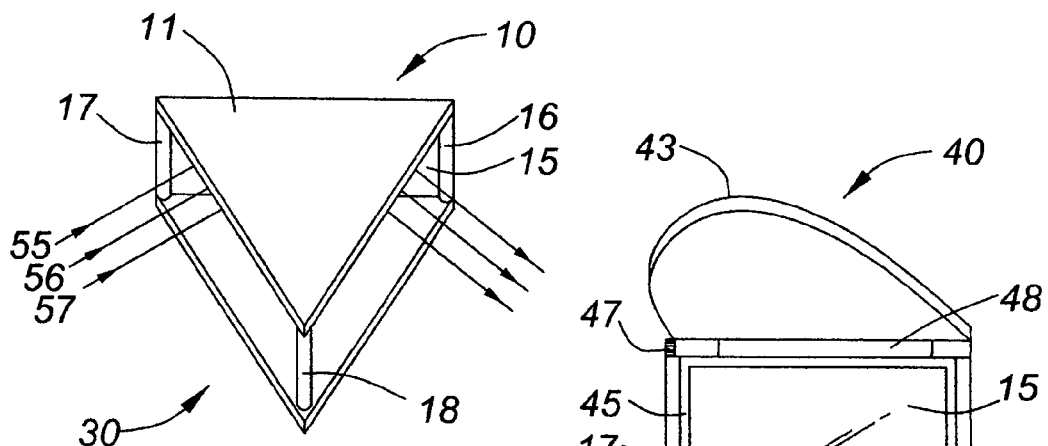
FIG. 1B
FIG. 1D
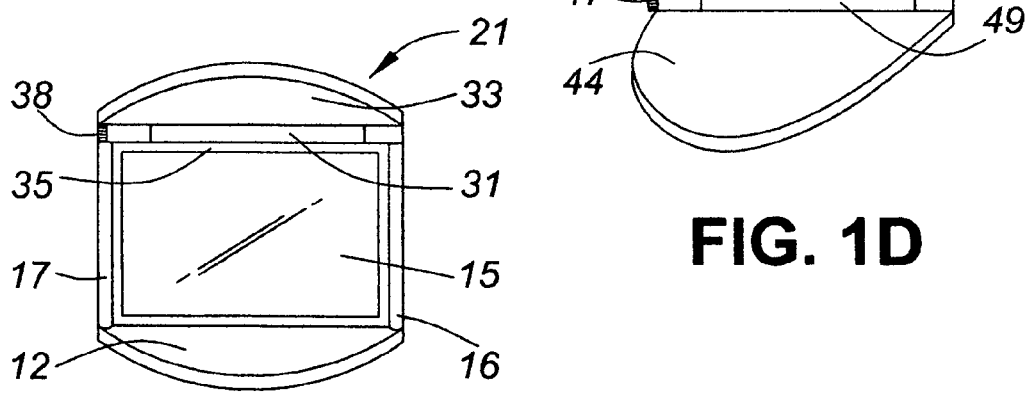
FIG. 1C

DISTORTION-FREE IMAGE CAPTURE MIRROR WHICH MAY BE USED WITH AN AUTOMOTIVE SIDE VIEW MIRROR FOR CAPTURING AN IMAGE FROM AN AREA REPRESENTING A BLIND SPOT FOR A DRIVE OF A VEHICLE FITTED WITH THE DISTORTION-FREE IMAGE CAPTURE MIRROR

CROSS-REFERENCE TO RELATED APPLICATIONS

This application is a continuation-in-part of U.S. application Ser. No. 10/983,922, filed Nov. 8, 2004, now abandoned.

TECHNICAL FIELD

The object of this invention is to provide for a distortion free image capture mirror assembly, and more particularly one which can be associated with side view mirrors for use by drivers on all type of vehicles.

BACKGROUND OF THE INVENTION

Many drivers have had a close call at the "Blind Spot", the area where cars or other vehicles are not typically visible in a rear-view mirror or a side view mirror. My prior U.S. Pat. No. 5,594,594 shows an approach for dealing with this problem. Other prior art is set forth in the foregoing patent. However, the cost of manufacturing the Triangle Prism System was too high. Therefore, I came up with a second idea called the Hollow Box. It then evolved to a Shelter Box. The final product stage became the Distortion Free Image Capture Mirror Assembly. However, when the various designs of the prior art are implemented they tend to have distracting background views, and fail to channel the image from the critical blind spot area with a clear non-distorted view towards the driver.

The problems solved by my invention has never before been recognized. On prior art references that have to do with the blind spot area, none of them even came close to what I have developed. Previous inventions employed the convex mirror that came with the distortion of view. For those who tried to employ flat mirrors using one or more pieces combined by turning the mirrors toward the blind spot, this turned the image away or limited the image from the driver's sight. That design causes a lot of difficulty to view or focus.

OBJECTS AND SUMMARY OF THE INVENTION

An important object of this invention is to provide a device for viewing the blind spot which is simple and inexpensive to implement to give a driver a greater degree of safety.

More particularly, it is an object of the present invention to provide a distortion free image capture mirror assembly which will serve to eliminate distracting background views and direct or channel the image from the critical blind spot area with a clear non-distorted view toward the driver.

The present invention is an image capture mirror assembly including a distortion free mirror and image channeling flaps above and below the mirror, the flaps being almost any shape imaginable, for example: rectangular, circular, triangular, elliptical, etc.

In accordance with the above a regular plain mirror, or distortion free mirror, made from glass, plexiglass, acrylic or other material with reflecting surface is provided with image channeling flaps. The flaps are placed horizontally above and below the surface of the distortion free mirror, the upper flap hereinafter being referred to as an awning, and the lower flap being referred to as a sill. In addition, two smaller side support beams for further channeling the image may be positioned vertically, one on the left-side of the distortion free mirror, and one on the right-side. The surrounding edges and the surface area of the awnings, sills and/or beams can be covered with light absorbing materials, or be replaced with the following: light reflectors, glow-in-the dark materials, or reflecting prisma-strips etc.

These two horizontal surfaces and two side beams for image channeling will serve to eliminate distracting background view and direct or channel the image from the critical blind spot area with a clear non-distorted view toward the driver.

The image channeling awning, sill, and/or beams can be augmented with bright colors inside and around the edges. They can be made with non-reflecting light weight materials such as plastic, rubber, tile, aluminum, durable cardboard, light metal etc.

By employing my new method of awning and sill combined with the flat mirrors to solve blind spot problem(s) has never been done before.

The objects set forth above and other objects and advantages of the present invention will be more fully understood after a consideration of the following detailed description taken in conjunction with the accompanying drawings in which preferred modes of the present invention are illustrated.

BRIEF DESCRIPTION OF THE FIGURES

FIG. 1A shows a first embodiment of the distortion free image capture mirror assembly of this invention.

FIG. 1B shows a second embodiment of the distortion free image capture mirror assembly of this invention.

FIG. 1C shows a third embodiment of the distortion free image capture mirror assembly of this invention.

FIG. 1D shows a fourth embodiment of the distortion free image capture mirror assembly of this invention.

DETAILED DESCRIPTION

Figure 2A:
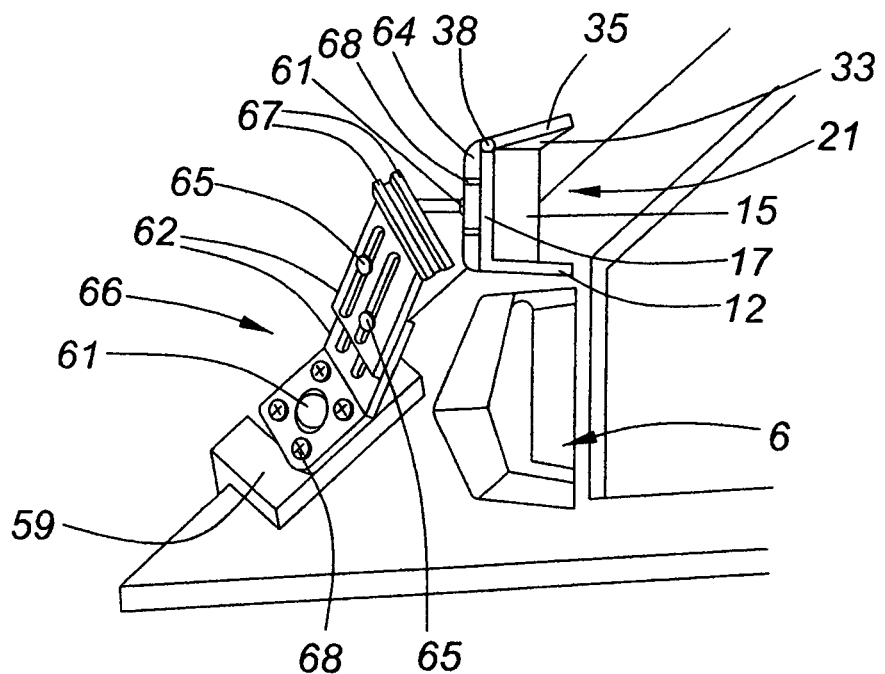
FIGS. 2A and 2B shows side and top views, respectively, of a first mounting assembly supporting the third embodiment adjacent a typical side view mirror of an automobile.

A distortion free image capture mirror assembly of this invention is shown in FIG. 1A. This assembly, which is indicated generally at 20, is provided with a distortion free mirror 15, which is a regular plain mirror made from glass, plexiglass, acrylic or other material with a distortion free reflecting surface. The light ray lines 55, 56, 57, which indicate the direction of the light traveling from the blind spot area, get reflected by the distortion free mirror 15 and then exit toward the driver eyes 13. A panoramic view of the blind spot is therefore achieved. The image rays can enter at any angle and likewise get reflected by the distortion free mirror 15. On top of the distortion free mirror 15 is an image channeling awning 11 and at the bottom is an image channeling sill 12. In a preferred design, the image channeling awning and the image channeling sill are at obtuse angles with respect to the mirror 15. On the right side of the mirror 15 is a beam 16 and on the left side is a beam 17. The surfaces of the image channeling awning 11, image channeling sill 12, and beams 16 and 17 can be a glass fabrication, or it can be replaced with light weight materials such as plastic, rubber, aluminum, tile, durable cardboard, light metal etc. These surfaces will serve to eliminate distracting background views and direct or channel an image from the critical blind spot area toward the driver. The shape of image channeling awning 11 and sill 12 can assume an infinite numbers of forms ranging from rectangular, triangular, circular, etc. In addition, instead of geometric shapes, other shapes can be employed such as shapes taken from nature. Some examples are an open cobra's mouth, a wing, a leaf, etc. The actual shape is limited only by the imagination bearing in mind that it should eliminate distracting background views and help to channel an image from the blind spot towards the driver. Bright colors inside and around the edges can be employed, either with reflecting or with non-reflecting material. The image channeling structures 11, 12, 16, and 17 can be provided with light sources with adjustable brightness or intensity, or bright colors with thick liquid substance, or paint materials, that's contained or sealed inside a glass, plastic or clear materials housing unit.

FIG. 1B shows an alternate embodiment of a configuration of an image capture mirror assembly 30 which will also operate according to FIG. 1A. There is shown a shelter box 10 of the image capture mirror assembly 30 including distortion free mirror 15, the shelter box including top and bottom image channeling flap and sill 11 and 12 of a triangular shape, the assembly 30 also including beams 16 and 17 on the right and left sides, and at the front is a further apex beam 18. The triangular flap and sill can have angles ranging from 35° up to and including 70°. The two front surface of triangular shelter box unit flap and sill 11 and 12 can have different combination of angles such as one side with 45° and another side with 30°. To achieve the optical image from the blind spot area an image would enters from the one-side of the shelter box opening, get reflected from the distortion free mirror 15 and exit the other side of the shelter box. Beams 16 and 17 act as side support beams as well as angles beams and the front apex beam 18 serves to eliminate distracting background views and to allow the eyes to focus and capture the image instantly. Beams 16, 17, 18 and the surrounding image channeling structures 11, 12 can incorporate light or laser sources with adjustable brightness or intensity for nighttime use. It may apply to other shapes besides the triangle mentioned here. In a preferred design, both the top and bottom image channeling flaps will be at an obtuse angle with respect to the mirror 15.

FIG. 1C shows an alternate embodiment of configuration which will operate according to FIG. 1A. This image capture mirror assembly, which is indicated generally at 21, includes a base assembly or housing 35 which supports a distortion free mirror 15, a sill 12 on the bottom, on the right side a beam 16, and on left side a beam 17, all of which are fixed to the housing 35 in any conventional manner, for example by glue, epoxy or paste. On the top of the assembly 15, 12, 16, and 17 is awning 33 which has individual up and down adjustment. Thus, a swivel post 31 is adapted to provide rotational movement with tightening knob 38. The image capture mirror assembly 21 is designed for mounting near the side view mirror or below the side view mirror, on mid-size vehicles up to and including commercial vehicles.

FIG. 1D, shows a semi-heart shaped configuration of the flaps of an image capture mirror assembly 40 which will operate according to FIG. 1A, the image capture mirror assembly 40 including a housing 45. On the back of the housing is distortion free mirror 15, and on top is awning 43 which is connected to the housing via a swivel post 48 with tightening knob 47. At the bottom is sill 44 which is connected to the housing via a swivel post 49 and tightening knob 47. As can be seen, both the awning and the sill have individual up and down adjustment. On the right side is a beam 16 and on left side is a beam 17, which beams are secured to the housing 45. Image capture mirror assembly 40 is designed to be employed in all positions.

Figure 2B:
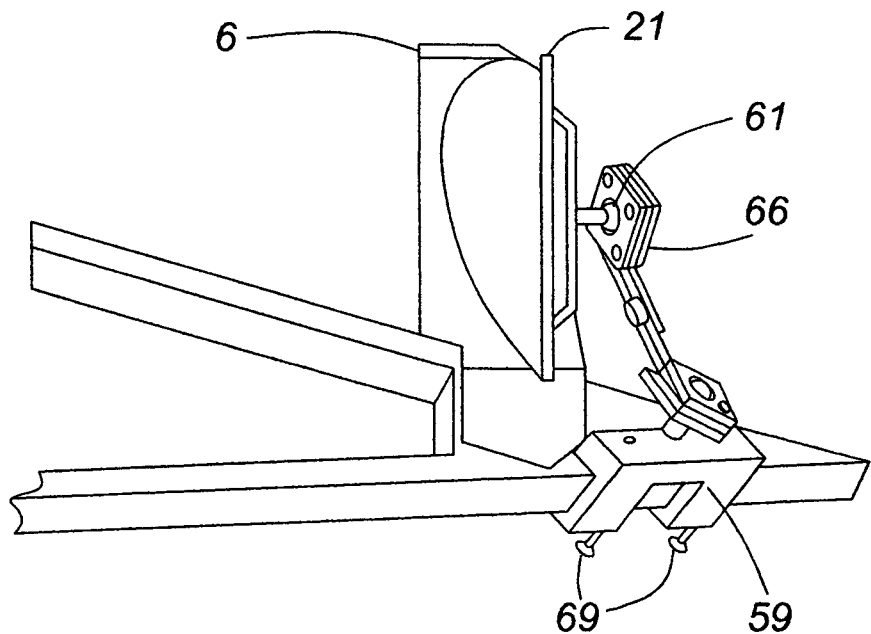

FIGS. 2A and 2B show side and top views of the image capture mirror assembly 21 on top of a typical side view mirror 6. On the rear of the housing 35 is a support plate 64. In the middle of support plate 64 is ball joint 61, and screws 68, which are connected to auxiliary arm attachment unit 66, which has two ball joint holding plates 67, two sliding plates 62, and two bolts 65 for locking the position of the plates 62. A further ball joint 61 is at the bottom, and is connected to inverted J shaped clamp 59, with two screws 69 serving as the tightening mechanism. This style is ideal for thick or thin areas of metal panel on the door of a vehicle. This method of attachment is from the inside of the vehicles.

Figure 2C:
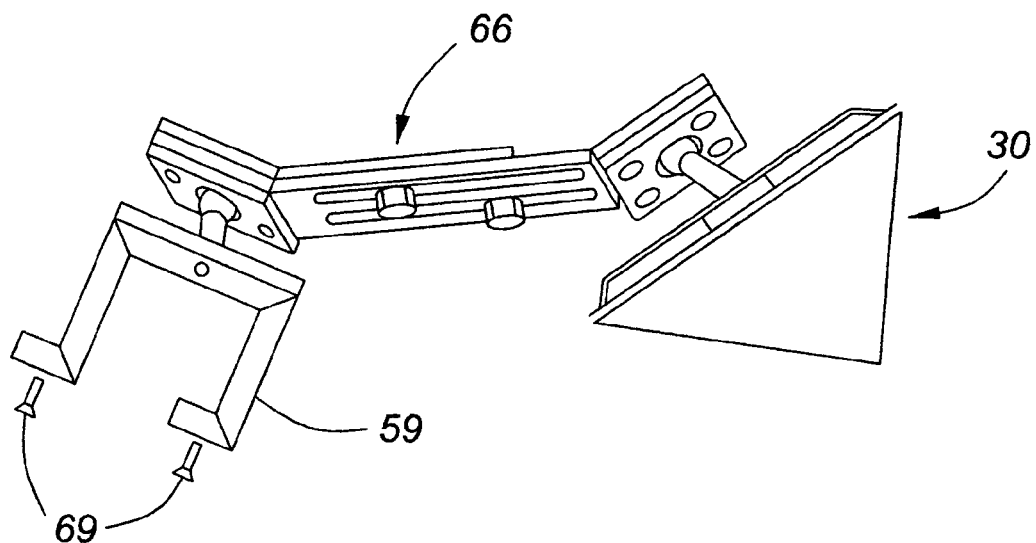
FIG. 2C shows a perspective view of the first mounting assembly carrying an embodiment of this invention similar to that shown in FIG. 1B, but without the beam at the apex of the triangles.

FIG. 2C shows the triangle configuration of the image capture mirror assembly 30 illustrated in FIG. 1B carried by an auxiliary arm attachment unit 66, and inverted J shaped clamps 59. This assembly will mount on a vehicle in the same manner at the assembly shown in FIGS. 2A and 2B.

Figure 2D:
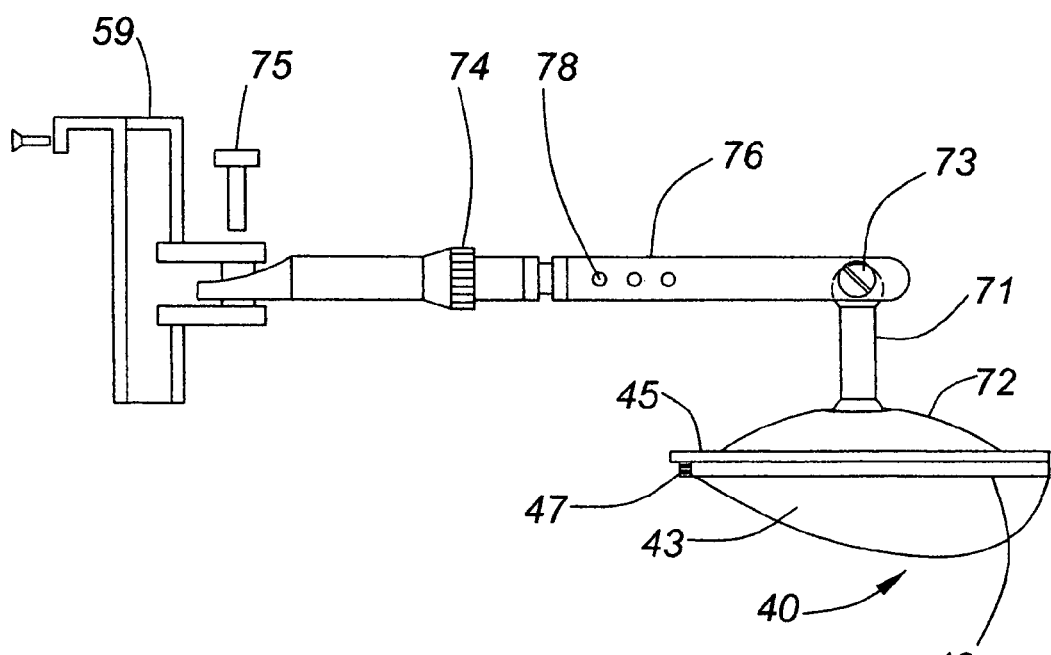
FIG. 2D shows a top view of the second mounting assembly carrying a fifth embodiment of the distortion free image capture mirror assembly of this invention, this embodiment having the semi-heart shaped awning and sill of FIGS. 1C and 1D, but not having the swivel posts.

FIG. 2D, shows the semi-heart shape configuration of the image capture mirror assembly 40 of the designs shown in FIG. 1D. This mirror assembly has a support plate 72 connected via ball joint 71 and screws 73 to a telescoped arm attachment unit 76, with the locking pin 78 and the tightening knob 74 in the middle for lock in position, and bolts 75 is connected between telescoped arm unit 76 and J shaped clamp 59.

Figure 2E:
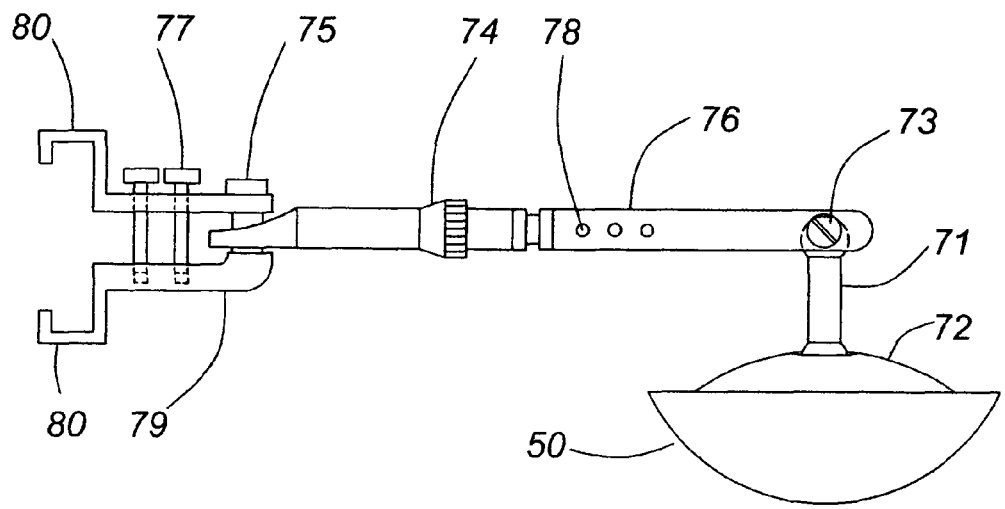
FIG. 2E shows a top view of the modified second mounting assembly carrying a sixth embodiment of the distortion free image capture mirror assembly of this invention, this embodiment having a semi-circular shaped awning and sill.

FIG. 2E shows a semi-circle configuration of image capture mirror assembly 50. On the back of housing 72 is ball joint 71 and screws 73, which connect to telescoped arm attachment unit 76 with the locking pin 78, which operate according FIG. 2D. A clip on attachment unit 79, including bolts 75 and screws 77, and C-shaped clips 80 which have a rubber pad or soft material which contacts the vehicle body. This method of attachment is preferred where there is little or no metal area of anchoring. This attachment is from the outside of the vehicles.

Figure 2F:
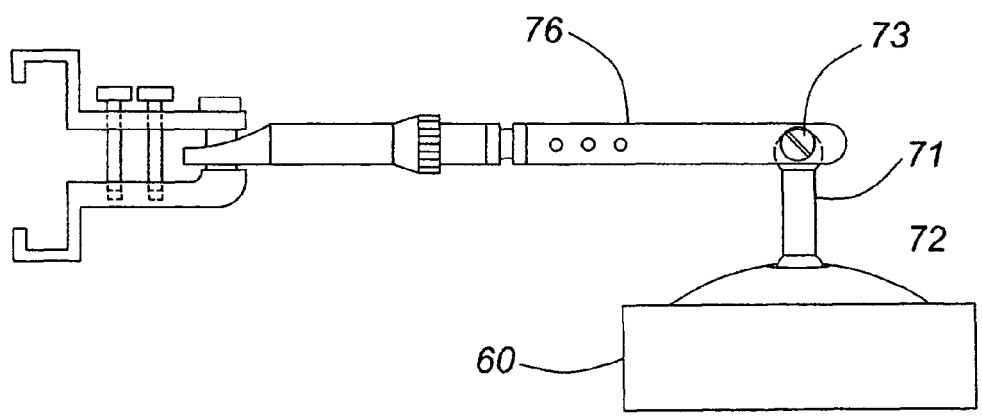
FIG. 2F shows a top view of the modified second mounting assembly carrying a seventh embodiment of the distortion free image capture mirror assembly of this invention, this embodiment having a rectangular shaped awning and sill.

FIG. 2F, shows a rectangular configuration of an image capture mirror assembly 60, which will operate according to FIG. 1 and a telescoped arm attachment unit 76, which will operate according to FIG. 2E.

FIG. 2C to FIG. 2F show just some of the possible design shapes of this invention. The auxiliary attachment units shown above are just some samples of attachment units and many other styles of attachment units can be incorporated or employed with this invention.

A typical side view mirror housing can be modified to incorporate the image capture mirror assembly of this invention, either above or below the conventional side view mirror.

Thus the housing for the conventional side view mirror can be modified to incorporate the image capture mirror assembly of this invention. It would be adjustable in all direction and hence can be tilted up or down or side ways as is known. Alternatively, the image capture mirror assembly could be positioned on top of side view mirror of a motorcycle.

As can be seen from the above, the mirror will provide a better image of the blind spot. In addition, the "awning" will prevent the accumulation of snow or sleet on the mirror. The benefits of this Distortion Free Image Capture Mirror Assembly are:

1. The invention design views directly to blind spot area without any distortion.
2. To allow multiple shapes design by employ on this invention.
3. Improves safety on the road, helps in making safe lane change.
4. It is simple and inexpensive to implement.
5. It has the capability to provide employment opportunities in the region.

While a preferred form of this invention has been described above and shown in the accompanying drawings, it should be understood that applicant does not intend to be limited to the particular details described above and illustrated in the accompanying drawings, but intends to be limited only to the scope of the invention as defined by the following claims. In this regard, the claims are intended to include not only the designs illustrated in the drawings of this application and the equivalent designs discussed in the text, but it is also intended to cover other equivalents now known to those skilled in the art, or those equivalents which may become known to those skilled in the art in the future.

What is claimed is:

1. A distortion free image capture mirror assembly which may be used with an automotive side view mirror; the mirror assembly comprising:

a distortion free mirror;

means associated with the distortion free mirror for eliminating distracting background views and directing or channeling the image from the critical blind spot area with a clear non-distorted view toward the driver, the means including a housing which supports the distortion free mirror, an image channeling awning mounted on the housing above the distortion free mirror, and an image channeling sill mounted on the housing below the distortion free mirror, where one or both of the image channeling awning and image channeling sill are adjustable, wherein side beams to the right and left sides of the distortion free mirror are provided, which beams also eliminate distracting background views and direct or channel the image from the critical blind spot area with a clear non-distorted view toward the driver and where both the image channeling awning and the image channeling sill are triangular, and wherein a further beam is provided, the beam extending from the apex of the triangular awning to the apex of the sill.

* * * * *